United States Patent
Gouch

(10) Patent No.: US 9,903,785 B2
(45) Date of Patent: *Feb. 27, 2018

(54) METHOD AND APPARATUS FOR IMAGE SCANNING

(71) Applicant: FFEI Limited, Hemel Hempstead (GB)

(72) Inventor: Martin Philip Gouch, Hemel Hempstead (GB)

(73) Assignee: FFEI Limited, Hemel Hempstead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,854

(22) Filed: Dec. 27, 2016

(65) Prior Publication Data

US 2017/0167948 A1    Jun. 15, 2017

Related U.S. Application Data

(63) Continuation of application No. 14/235,483, filed as application No. PCT/GB2012/051824 on Jul. 27, 2012, now Pat. No. 9,638,573.

(30) Foreign Application Priority Data

Jul. 29, 2011   (GB) .................................. 1113071.3

(51) Int. Cl.
   *G01J 1/00*       (2006.01)
   *G01M 11/02*    (2006.01)
   (Continued)

(52) U.S. Cl.
   CPC ........... *G01M 11/0257* (2013.01); *G01J 1/02* (2013.01); *G02B 21/006* (2013.01);
   (Continued)

(58) Field of Classification Search
   CPC ....... G01J 1/02; G02B 21/245; G02B 21/367; G02B 21/006; G02B 21/241; G02B 21/0016; G02B 21/008
   (Continued)

(56) References Cited

U.S. PATENT DOCUMENTS 6,640,014 B1   10/2003   Price et al.
7,330,574 B2   2/2008    Olszak
(Continued)

FOREIGN PATENT DOCUMENTS

CN     1882031 A      12/2006
EP     1 610 166 A1   12/2005
(Continued)

OTHER PUBLICATIONS

International Search Report of PCT/GB2012/051824, dated Jan. 15, 2013.

(Continued)

*Primary Examiner* — Hina F Ayub
(74) *Attorney, Agent, or Firm* — Sughrue Mion, PLLC

(57) ABSTRACT

A method of estimating an in-focus level of a target in an image scanning apparatus is provided, wherein the image scanning apparatus comprises a first line scan detector configured to obtain one or more image scan lines of the target and a second line scan detector configured to obtain one or more focus scan lines of the target. The method comprises obtaining at least one image scan line of the target using the first line scan detector, each at least one image scan line being obtained at a respective focus level; obtaining at least one focus scan line of the target using the second line scan detector, each at least one focus scan line being obtained at a respective focus level; calculating at least one focus parameter using at least the at least one focus scan line; and estimating a nominal in-focus level of the target using the calculated focus parameter(s).

28 Claims, 12 Drawing Sheets

(51) Int. Cl.
  *G02B 21/24* (2006.01)
  *G02B 21/36* (2006.01)
  *G01J 1/02* (2006.01)
  *G02B 21/00* (2006.01)

(52) U.S. Cl.
  CPC ......... *G02B 21/245* (2013.01); *G02B 21/367* (2013.01); *G02B 21/008* (2013.01); *G02B 21/0016* (2013.01)

(58) Field of Classification Search
  USPC .......................................................... 356/123
  See application file for complete search history.

(56) References Cited

U.S. PATENT DOCUMENTS

| | | | |
|---|---|---|---|
| 7,345,755 | B2 | 3/2008 | Ogawa et al. |
| 9,116,035 | B2 * | 8/2015 | Gouch ...................... G01J 1/02 |
| 9,638,573 | B2 * | 5/2017 | Gouch ................ G02B 21/245 |
| 2002/0044346 | A1 | 4/2002 | Nguyen et al. |
| 2003/0112504 | A1 | 6/2003 | Czarnetzki et al. |
| 2005/0286800 | A1 | 12/2005 | Gouch |
| 2006/0238847 | A1 | 10/2006 | Gouch |
| 2009/0185167 | A1 | 7/2009 | Gouch |

FOREIGN PATENT DOCUMENTS

| | | |
|---|---|---|
| EP | 1 691 541 A2 | 8/2006 |
| JP | 08-334668 A | 12/1996 |
| JP | 2000-275027 A | 10/2000 |
| JP | 2001-165625 A | 6/2001 |
| JP | 2002-535717 A | 10/2002 |
| JP | 2004-509360 A | 3/2004 |
| JP | 2004-151263 A | 5/2004 |
| JP | 2005-202092 A | 7/2005 |
| JP | 2006-11446 A | 1/2006 |

OTHER PUBLICATIONS

Japanese Office Action dated Nov. 15, 2016 issued in Japanese Application No. 2015-128442.
Japanese Office Action dated Jun. 14, 2016 issued in Japanese Application No. 2015-128442.

* cited by examiner

METHOD AND APPARATUS FOR IMAGE SCANNING

CROSS-REFERENCE TO RELATED APPLICATIONS

This application is a continuation of U.S. application Ser. No. 14/235,483, filed Feb. 21, 2014, which is a National Stage of International Application No. PCT/GB2012/051824 filed Jul. 27, 2012, claiming priority based on British Patent Application No. 1113071.3, filed Jul. 29, 2011, the contents of all of which are incorporated herein by reference in their entirety.

FIELD OF THE INVENTION

The present invention relates to a method and apparatus for image scanning, and in particular, but not limited to, the use of a virtual microscope.

BACKGROUND OF THE INVENTION

FIG. 1 illustrates a typical arrangement of a virtual microscope used for image scanning as is known in the prior art. The arrangement comprises an imaging lens 1 which focuses light originating from a slide 6 onto a line scan detector 2. The imaging lens and the line detector together make up an imaging system. As the detector 2 is a line scan detector, the image area 7 is a line. In order to produce an extended image over a larger area of the slide 6, the slide is moved relative to the imaging lens and line scan detector, as indicated by arrow 8. In this sense the slide is "scanned" by the line scan detector.

The line scan detector is typically used to image a sample prepared upon the slide. The sample may be a biological specimen for example. Typically, the sample to be imaged will have an inhomogeneous surface topography with a focus variation greater than the depth of field of the imaging system. Typically, a single scan of the slide will be approximately 1 mm wide and between 2 mm and 60 mm long. Over the scale of 1 mm, the focus of the sample very rarely exceeds the depth of focus of the imaging system (typically approximately 1 μm). However, over larger distances such as 20 mm, the change of focus of the sample can exceed the depth of field of the imaging system. There is therefore the problem that the output image produced by a line scan detector while scanning a sample is likely to have areas which are in focus and areas which are out of focus, due to changes in the surface topology of the sample. This is unacceptable, especially in cases where accurate analysis of the sample is required.

There have been various attempts made to overcome this problem. For example, U.S. Pat. No. 7,518,652 discloses the use of a focus map wherein the adjustment of focus of the imaging system during the scan is predetermined. However, this requires the whole sample to be analysed before the scan can commence which is very time consuming, or only particular points on the sample are taken and therefore areas between the points are unlikely to have good focus.

U.S. Pat. No. 7,485,834 discloses temporarily changing the focus of the imaging lens during scanning of the sample to see if there is a better focus position. However, as the scan speed of the sample increases, this means that there is less time to move the imaging lens in search of a better focus position. This means that either the scanning speed has to be kept below a certain speed, or the change of position of the imaging lens has to occur over more imaging lines, which is more difficult to interpolate the image across. Both of these scenarios are undesirable.

U.S. Pat. No. 7,330,574 discloses a 2D imaging detector which is tilted in the scanning direction such that the best-focus plane of the imaging system intercepts the surface of the sample during the scan. The sample is moved one, or a small number of frames for each frame, thereby building up a 3D scan of the sample which can be used for focus calculation. This is done before scanning, as if the process were to be performed during the scan, the data rate required by the 2D scanner would be much greater.

There is therefore a requirement to improve the focussing of a sample during an imaging scan, such that the sample can be scanned quickly, and in focus.

SUMMARY OF THE INVENTION

In accordance with a first aspect of the present invention, there is provided a method of estimating an in-focus level of a target in an image scanning apparatus, wherein the image scanning apparatus comprises a first line scan detector configured to obtain one or more image scan lines of the target and a second line scan detector configured to obtain one or more focus scan lines of the target, the method comprising: obtaining at least one image scan line of the target using the first line scan detector, each at least one image scan line being obtained at a respective focus level; obtaining at least one focus scan line of the target using the second line scan detector, each at least one focus scan line being obtained at a respective focus level; calculating at least one focus parameter using at least the at least one focus scan line; and estimating a nominal in-focus level of the target using the calculated focus parameter(s).

Here, the term "level" can be seen to be analogous to "position", such that the nominal in-focus level is the position of the focal plane of the image scanning apparatus when imaging the target. Preferably, the first line scan detector is operable to obtain an output image of the target which is desired to be in focus, and therefore the method preferably further comprises adjusting the focus level of the first line scan detector to the nominal in-focus level of the target. In other words, the position of the first line scan detector is adjusted such that the first line scan detector is in the focal plane of the image scanning apparatus and the target is thus in focus.

The present invention advantageously enables the in-focus level of the target to be obtained quickly and easily, thus allowing in-focus images of the target to be obtained. This is particularly advantageous when the target is moved relative to the image scanning apparatus such that the first and second line scan detectors "scan" the target a line at a time. The target (which may be a biological specimen on a slide for example) may have a relief structure with varying topography which will alter its in-focus level as it is scanned by the image scanning apparatus. Being able to estimate the in-focus level quickly and accurately is therefore advantageous.

The at least one focus parameter is a means of relating a focus levels of a line scan detector to a measure of how "in focus" an image scan line is at that particular focus level. The focus parameter may take a number of forms, although preferably the focus parameter is a "focus merit" value having a maximum value representing an in-focus level. The focus merit value maps how "in focus" the image scan lines are on to a numerical scale. For example, an image scan line which is perfectly in focus will have a focus merit value of "1", whereas an image scan line which is perfectly out of focus will have a focus merit value of "0".

Using a second line scan detector to obtain at least one focus scan line means that the in-focus level does not have to be found by moving the first line scan detector until the in-focus level is obtained. This is an extremely time consuming operation and is undesirable. For example, with the use of only one line scan detector, line images are "sacrificed" as the detector is moved until desired focus level is obtained. The use of the separate focus line scan allows a quick estimation of the in-focus level without the need for said "sacrificing" of line images.

The method of the present invention comprises calculating at least one focus parameter using at least the at least one focus scan line. It is important that at least one focus parameter is obtained from the at least one focus scan line in order to estimate the in-focus level. In some embodiments the in-focus level may be estimated using only focus parameter(s) obtained from the focus scan line(s) without using the image scan lines. This works best when the target is substantially homogenous across its area imaged by the line scan detector. However, the in-focus level may also be estimated by comparison of a focus parameter calculated from the at least one focus scan line with a focus parameter calculated from the at least one image scan line. In some embodiments more than one focus parameter may be obtained using a plurality focus scan lines, whereas only one focus parameter may be calculated using a single image scan line. The opposite scenario may also be true. In other embodiments a plurality of focus parameters may be calculated using a plurality of focus scan lines, and a plurality of focus parameters may be calculated using a plurality of image scan lines. A method may utilise any combination of the above possibilities.

The method may further comprise the step of calculating at least one further focus parameter using either said at least one image scan line or a further said focus scan line. For example, a further focus parameter may be obtained from an image scan line. By ensuring that the focus level of the at least one focus scan line is different to the focus level of the at least one image scan line, this further focus parameter can be compared with the focus parameter calculated using a focus scan line in order to estimate the in-focus level. Preferably the focus parameters are normalised (typically to the focus parameter calculated from the image scan line). This simultaneous calculation of two focus parameters at differing focus levels allows for a particularly fast and accurate in-focus level estimation. Alternatively, a further focus parameter may be obtained from a further focus scan line at a different focus level to that of the first focus scan line. The two focus parameters from the focus scan lines can then be used to estimate the in-focus level.

The calculating step may further comprise calculating at least one focus parameter for each of the first line scan detector and second line scan detector using the respective at least one image scan line and at least one focus scan line. For example, a focus parameter may be obtained for the first line scan detector using an image scan line and a focus parameter may be obtained for the second line scan detector using a focus scan line. These focus parameters may be compared in order to estimate the in-focus level. Alternatively for example, a plurality of focus parameters may be obtained for the second line scan detector and a plurality of focus parameters may be obtained for the first line scan detector. As a further example a plurality of focus parameters may be calculated for the second scan line detector and a single focus parameter calculated for the first line scan detector.

By ensuring that the focus level of the first line scan detector and the focus level of the second line scan detector are different (for example, the second line scan detector may be placed at a shorter optical path distance from the target than the first line scan detector), the focus parameters calculated for the first and second line scan detectors can be used to estimate the nominal in-focus level. The focus parameters may simply be compared in order to estimate the in-focus level. For example, if the focus merit value of the focus scan line is less than the focus merit value of the image scan line, the in-focus level is either above the first line scan detector (i.e. the first line scan detector is positioned between the target and the in-focus level), or is already at the in-focus level. Therefore, by using a second line scan detector at a different focus level to the first line scan detector, two comparable focus parameters are obtained simultaneously and the in-focus level of the target can be estimated quickly.

The step of obtaining at least one focus scan line typically comprises modulating a focus level of the second line scan detector such that a plurality of focus scan lines are obtained at different focus levels. In such a case, a plurality of focus parameters are typically calculated—one for each of the plurality of focus levels of the second line scan detector. These plurality of focus parameters are preferably normalised to a focus parameter obtained from an image scan line and used to generate a "focus merit curve", which plots the focus merit obtained at each focus level against the focus levels. The maximum of this curve can then be used to estimate the in-focus level of the target and the first line scan detector is moved towards this maximum. Modulating the focus level of the second line scan detector advantageously removes the requirement for several line scan detectors at different focus levels, which would decrease the amount of light impinging on the first line scan detector, thereby decreasing image quality.

There are a number of ways of modulating the focus level of the second line scan detector, which shall be discussed in more detail below.

The image and focus scan lines may be obtained from a common position within a plane passing through the target and having a plane normal defining an optic axis along which each of the first and second line scan detectors receive image information so as to produce the said respective image and focus scan lines. Image information may be reflected to one of the said line scan detectors using a beam splitter. This ensures that each of the first and second line scan detectors simultaneously image the same spatial location on the target as the beam splitter produces two images of the same spatial location on the target. A beam splitter may also be used to direct image information to a third line scan detector at a further focus level different to those of the first and second line scan detectors, such that a further focus parameter can be calculated. Using as beam splitter advantageously means that the calculated focus parameters are not affected by spatial variations in the target, thereby simplifying the in-focus level estimation and improving its accuracy. Other means of reflecting the image information are envisaged, however.

Alternatively, the image and focus scan lines may be obtained from different positions in the target and wherein image information is obtained by the said first and second line scan detectors along different optic axes from the target. Although this means that the first and second line scan detectors simultaneously image different spatial regions of the target, this does ensure that each detector is fully illuminated (unlike with the use of a beam splitter), thereby improving image quality. This is particularly important for the output image from the first line scan detector.

The first and second line scan detectors may be located adjacent each other, or alternatively image information may be reflected to one of the said line scan detectors using a mirror, such as a turning mirror. As the first and second line scan detectors receive image information along different optic axes from the target, use of the mirror to reflect light to one of the line scan detectors advantageously does not reduce the illumination of the other line scan detector.

The method may further comprise rotating the mirror about a point centred upon the optic axis of the line scan detector to which it is reflecting image information (preferably the second line scan detector), so as to provide focus scan lines of the target at different focus levels. In a similar manner as described above, here the focus parameters may be used to generate a focus merit curve plotting the focus merit values of the focus scan lines at each focus level. The peak of the focus merit curve then provides the nominal in-focus level of the target and the first line scan detector is moved towards that maximum.

Alternatively, the mirror may be rotated about a point displaced from the optic axis of the line scan detector to which it is reflecting image information. Advantageously, this provides a greater change in focus level with the same turning angle of the mirror.

If the target is moved relative to the image scanning apparatus (i.e. during a scan), the target is preferably moved in accordance with the rotation of the mirror such that the focus line scans are obtained from a common location upon the target. This ensures that the focus parameters, such as focus merit values, are not affected by spatial variations in the target. This allows for a more accurate estimate of the in-focus level.

As an alternative to rotating the mirror, the method may comprise moving the second line scan detector with respect to the target so as to obtain a plurality of focus line scans at different focus levels. The movement of the second line scan detector is preferably to and fro along its optic axis. In a similar manner as described above, here the focus parameters may be used to create a focus merit curve by plotting the focus merit values of the focus scan lines at each focus level. The peak of the focus merit curve then provides the estimated nominal in-focus level of the target.

As a further alternative, the method may comprise the step of modulating the focus level as a function of position across the scan line of the second line scan detector. For example, the second line scan detector may be rotated about an axis perpendicular to its optic axis. This provides a differential focus along the scan line of the detector, which can be used to calculate the focus parameter(s) for the second line scan detector. As an alternative, the second line scan detector may be positioned at an angle to the optic axis such that each position on the second line scan detector is at a different focus level. A focus parameter may then be calculated at each focus level.

Modulating the focus level as a function of position across the scan line of the second line scan detector in order to estimate a nominal in-focus level of the target works well when the target is substantially homogenous in space across the area (line) to be imaged by the line detectors (i.e. there are no areas on the target which are particularly detailed in comparison to the rest of the target, and the topography is substantially constant). However, if the sample has an area of detail that will only be imaged at one end of the first and second detectors, this can undesirably shift the estimated nominal in-focus level away from the correct level. In order to counter this, the method may further comprise using image data from one or each of the at least one focus or image scan lines to generate a detail parameter, and using the detail parameter in calculating the focus parameter(s). The focus parameter is therefore "normalised" to the level of detail in the target. The detail parameter is typically a nominal level of inhomogeneity within the target as a function of position on the line scan detector. For example, if there is a large amount of detail on the left side of the sample, the detail parameter will peak at the left side of the detector. Preferably the first line scan detector generates the detail parameter. Typically the detail and focus parameters are the same parameter, where the focus parameter is calculated from the focus scan line and the detail parameter is calculated from the image scan line.

The line scan detectors may be multi-channel detectors, with the method further comprising calculating an in-focus level for different channels of the detector. Typically the multi-channel detector will be an RGB detector. Due to the different frequencies of coloured light, each of the RGB channels has a different focus level. This feature can be used to evaluate a focus parameter for each channel and using one or more of the focus parameters for the channels in estimating the nominal in-focus level of the target. Evaluating a focus parameter for each channel provides an increased number of data points, thereby improving the accuracy of the estimated in-focus level.

If the target is moved relative to the image scanning apparatus, a temporal shift may be applied between the data from the scan lines of the first and second line scan detectors, wherein the temporal shift is a function of the relative movement between the target and the image scanning apparatus. This advantageously ensures that the data from the scan lines of the first and second line scan detectors is from the same spatial location on the target. This improves the accuracy of the in-focus level estimation as the focus parameters (for example focus merit values) are not affected by spatial variation on the target.

The image scan lines may be obtained from a number of locations upon the target so as to form a swathe. This is preferably performed by moving the target relative to the first and second line scan detectors such that the detectors image the target one line at a time. The line scan detectors preferably each comprise a linear array of sensors in order to scan one line of the target at a time. The target is typically moved in a plane perpendicular to the optic axis of at least one of the line scan detectors. Preferably, the focus level of the first line scan detector is adjusted to the nominal in-focus level in real time during the formation of a swathe such that the image scan lines within the swathe are obtained at different focus levels. This advantageously allows fast, in-focus scanning of a target. The scanning speed may be temporarily slowed if necessary in order to allow time for the first line scan detector to adjust to the in-focus position. However, it is generally assumed that the in-focus level will not substantially change over a small number of image lines, so this is not always necessary.

According to a second aspect of the present invention there is provided image scanning apparatus comprising: a first line scan detector configured to obtain one or more image scan lines of a target; a second line scan detector configured to obtain one or more focus scan lines of the target; and a processor configured to: obtain at least one image scan line of the target at a respective focus level using the first line scan detector; obtain at least one focus scan line of the target at a respective focus level using the second line scan detector; calculate at least one focus parameter using at least the at least one focus scan line; and estimate a nominal in-focus level of the target using the calculated focus parameter(s).

Preferably, the image scanning apparatus further comprises a first focussing device configured to modify the focus level between the target and the first line scan detector, and wherein the processor is further configured to operate the first focussing device to move the focus level of the first line scan detector to the estimated nominal in-focus level. This ensures that once the in-focus level has been estimated, the first line scan detector can be moved to said level in order that images of the target are in focus.

Preferably the image scanning apparatus further comprises a target stage for retaining the target, imaging optics for causing an image of the target to be provided to the first and second line scan detectors, and a drive system for causing the first line scan detector to obtain image information from different locations on the target. The imaging optics may for example comprise a lens for converging light rays originating from the target on to the first and second line scan detectors. In a case where each of the first and second line scan detectors is arranged to image a common location upon the target, the imaging optics may include a beam splitter to direct part of the image information from the target to the first line scan detector and part to the second line scan detector. In a case where the first and second line scan detectors lie upon different respective optic axes of the imaging optics, the imaging optics preferably includes a mirror arranged to direct part of the image information from the target to one of the first or second line scan detectors.

The drive system is preferably operable to move the target with respect to the first and second line scan detectors such that the first and second line scan detectors receive image information from the whole target. For example, the drive system may be operable to move the target stage, with the first and second line scan detectors and imaging optics held stationary; or may be operable to move the first and second line scan detectors and imaging optics, with the target held stationary.

Where the imaging optics comprises a mirror, the image scanning apparatus may further comprise a mirror drive adapted to rotate the mirror so as to direct different image information to the said line scan detector. The rotation of the mirror means that focus scan lines at different focus levels are obtained, and these are used in the generation of the focus parameter(s) of the respective line scan detector. Preferably, the mirror drive is operated in accordance with the drive system such that the focus line scans are obtained from a common location upon the target.

The image scanning apparatus may further comprise a detector drive adapted to move the second line scan detector to and fro along its respective optic axis. In a similar manner to the mirror drive, this means that focus scan lines at different focus levels are generated, which are used in the generation of the focus parameters.

Alternatively, the image scanning apparatus may further comprise a detector drive adapted to rotate the second line scan detector so as to modulate the focus level as a function of position across the scan line of the second line scan detector. Again, this generates a plurality of focus scan lines at different focus levels.

The apparatus may further comprise a third line scan detector for providing further focus scan lines. Preferably the third line scan detector is positioned at a different focus level to the first and second line scan detectors, with each detector at a different focus level. Typically at least one focus parameter will be calculated for the third line scan detector using the further focus scan lines. This provides more data points to accurately estimate the in-focus level.

One or each of the first and second line scan detectors may be a multi-channel detector. Preferably the multi-channel detectors are RGB detectors operable to detect red, green and blue light.

Typically the focus levels of the first and second line scan detectors are independently controllable. The first and second scan line detectors are also preferably identical such that the focus parameters are not affected by differences in the detectors. Preferably the apparatus is a virtual microscope.

The skilled person will appreciate that the line scan detectors described in the first and second aspects may be replaced with any suitable imaging detector.

According to a third aspect of the present invention there is provided a computer program product comprising program code means adapted to perform the method according to the first aspect.

BRIEF DESCRIPTION OF THE DRAWINGS

The present invention will now be described with reference to the following drawings, in which.

DETAILED DESCRIPTION OF THE DRAWINGS

Figure 1:
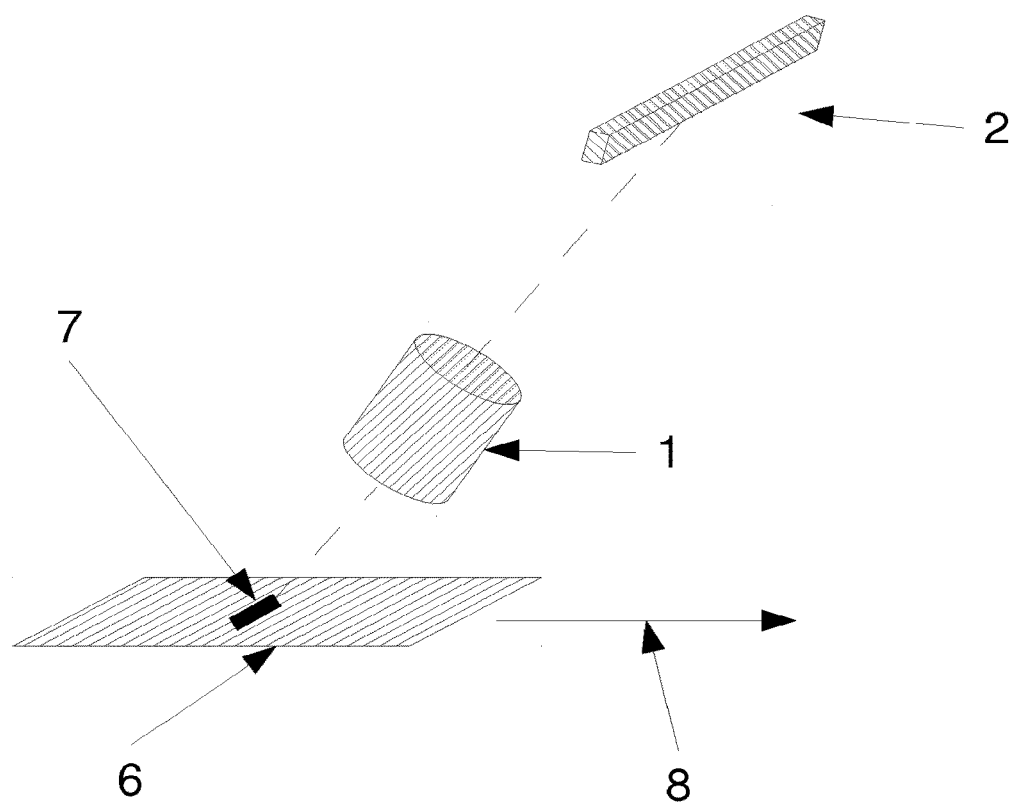
FIG. 1 illustrates an image scanning apparatus as is known in the art.

Throughout the following description, like reference numerals indicate like parts. Features from an embodiment may be combined with features from any of the other embodiments.

Figure 2:
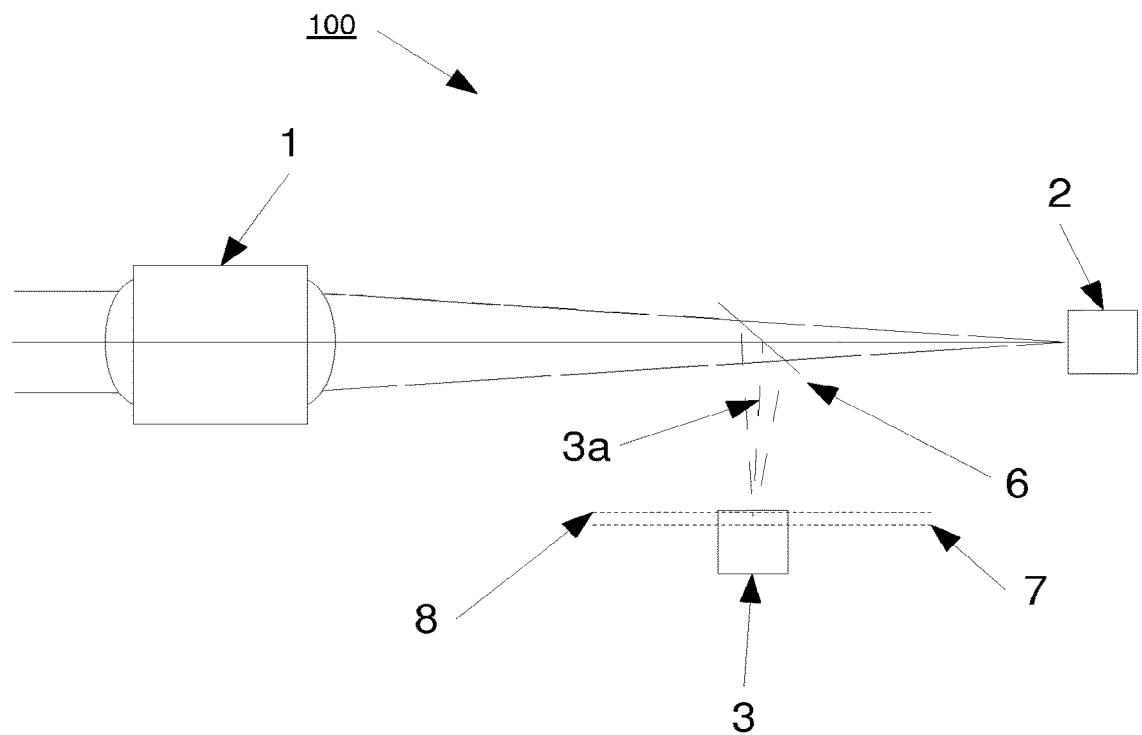
FIG. 2 illustrates an image scanning apparatus according to a first embodiment of the invention.

FIG. 2 illustrates a schematic view of a first embodiment of a virtual microscope according to the present invention. The image scanning apparatus 100 of the first embodiment comprises an imaging line scan detector 2 and a focussing line scan detector 3. An image of the sample (not shown) is imaged through lens 1 onto the imaging line scan detector 2. Typically the sample is moved relative to the apparatus 100 in a plane perpendicular to the optic axis of the imaging line scan detector 2 such that the sample is imaged as a series of line scans. It is desirable for the imaging line scan detector 2 to be placed in the focal plane of the imaging lens 1 such that the image is in focus throughout the scan. A beam splitter 6 is provided between the imaging lens 1 and the imaging line scan detector 3 and divides the imaging beam into two and produces a second image of the same spatial location of sample at co-conjugate plane 7. The focussing line scan detector 3 is positioned at a different focus level 8 to that of the imaging line scan detector such that the imaging line san detector 2 and the focussing line scan detector 3 produce image scan lines at different focus levels. In FIG. 2 the focus level 8 is such that light travels further to the imaging line scan detector than the focussing line scan detector (the focus level 8 is below co-conjugate plane 7), although the skilled person will appreciate that the focussing line scan detector 8 could also be positioned above the co-conjugate plane 7.

A "focus merit" value is then calculated for both the imaging line scan detector 2 and the focussing line scan detector 3. The calculation is typically based on the sum of the square of the differences between adjacent pixels, although alternative calculation routines may be used, for example based on the power through a high-pass or band-pass frequency filter. The focus merit value is a measure of how in focus the image scan lines obtained from the line scan detectors are and has a maximum value at an in-focus level. Such a value provides a numerical value which is dependent upon the amount of fine detail within the image information, with a larger focus merit value indicating more fine detail within the image information. The focus merit value of the focussing scan line detector is normalised to the focus merit value of the imaging scan line detector, for example by dividing the focus merit values obtained at the detectors 2, 3 by the focus merit value obtained at the imaging line scan detector 2. By comparing the two values it is possible to estimate in which direction the optimum focus level of the imaging detector is to be found, and the focus of the apparatus is adjusted to give the imaging line scan detector a greater focus merit than the focussing line scan detector.

Figures 3A, 3B, 3C, 3D:
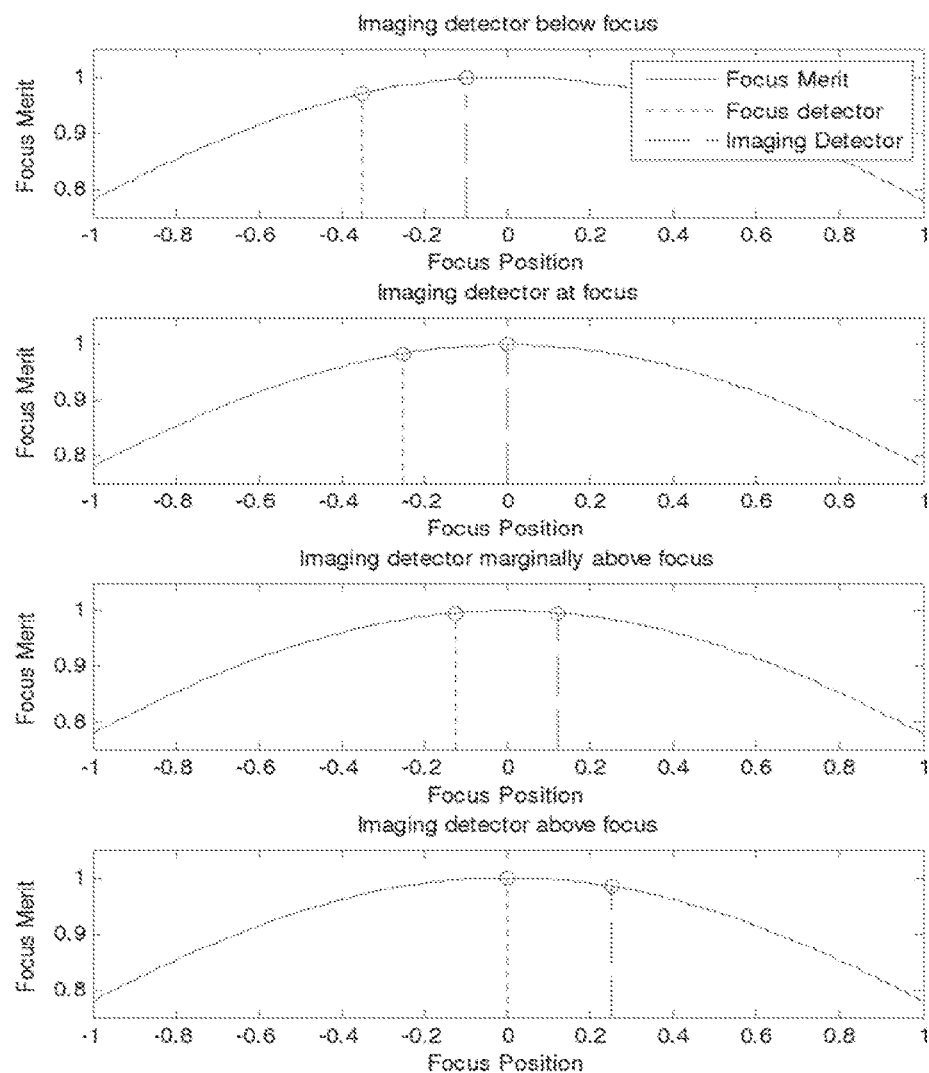
FIGS. 3A to 3D show focus merit curves according to the first embodiment of the invention.

In the case where the focussing line scan detector is positioned at a focus level 8 below the co-conjugate plane, when the focus merit of the focussing scan line detector 3 gives a merit value less than the imaging line scan detector 2, then the optimum focus is either above the imaging line scan detector or the optimum focus is already at the imaging line scan detector (FIGS. 3A, 3B). When the two focus merit values are similar (typically less than 5% difference) then the optimum focus is just below the imaging line scan detector (FIG. 3C). When the focussing line scan detector merit value is greater than the imaging line scan detector merit value, the optimum focus is below the imaging detector (FIG. 3D). Using this information it is possible to keep the imaging line scan detector at or just above the optimum focus. If the focus distance between the two detectors is small enough then any error in focus position produced by this method will be small enough that the quality of focus will not be compromised.

In the above-described first embodiment of the invention, the focus merit values between the imaging and focussing line scan detectors are simply compared in order to estimate the in-focus level. The focus merit curves seen in FIGS. 3A to 3D are for illustration purposes. The comparison protocol can be described as follows:

In general, if the focus merit of the imaging line scan detector is greater than the focus merit of the focus detector by a predetermined amount (typically 5%), move the focus level of the imaging line scan detector away from that of the focussing line scan detector (i.e. the in-focus level is closer to that of the imaging line scan detector than the focussing line scan detector). If the focus merit of the imaging line scan detector is smaller than the focus merit of the focussing line scan detector by a predetermined amount (typically 5%), move the focus level of the imaging line scan detector towards that of the focussing line scan detector. If the focus merit of the imaging line scan detector is greater than the focus merit of the focussing line scan detector by less than the predetermined amount (typically less than 5% difference), move the focus level of the imaging line scan detector towards that of the focussing line scan detector.

It is to be understood that the "predetermined amount" may differ depending on the application. Preferably, the magnitude of the difference in focus levels required in order to move the imaging line scan detector accordingly is nominally zero.

In a second embodiment of the present invention, the imaging line scan detector 2 and the focussing line scan detector 3 are both colour sensitive RGB detectors. This embodiment makes use of the residual chromatic aberration of the imaging lens 1. Each detector images the same spatial region on the sample but at different focus levels, and each red, green or blue channel within the detectors has a different focus level. Each channel on each detector calculates a focus merit value and the focus merits are then normalised to the channel on the imaging line scan detector 2 with the largest focus merit. This enables multiple points along a normalised focus merit curve to be plotted, as seen in FIGS. 4A to 4D.

Figures 4A, 4B, 4C, 4D:
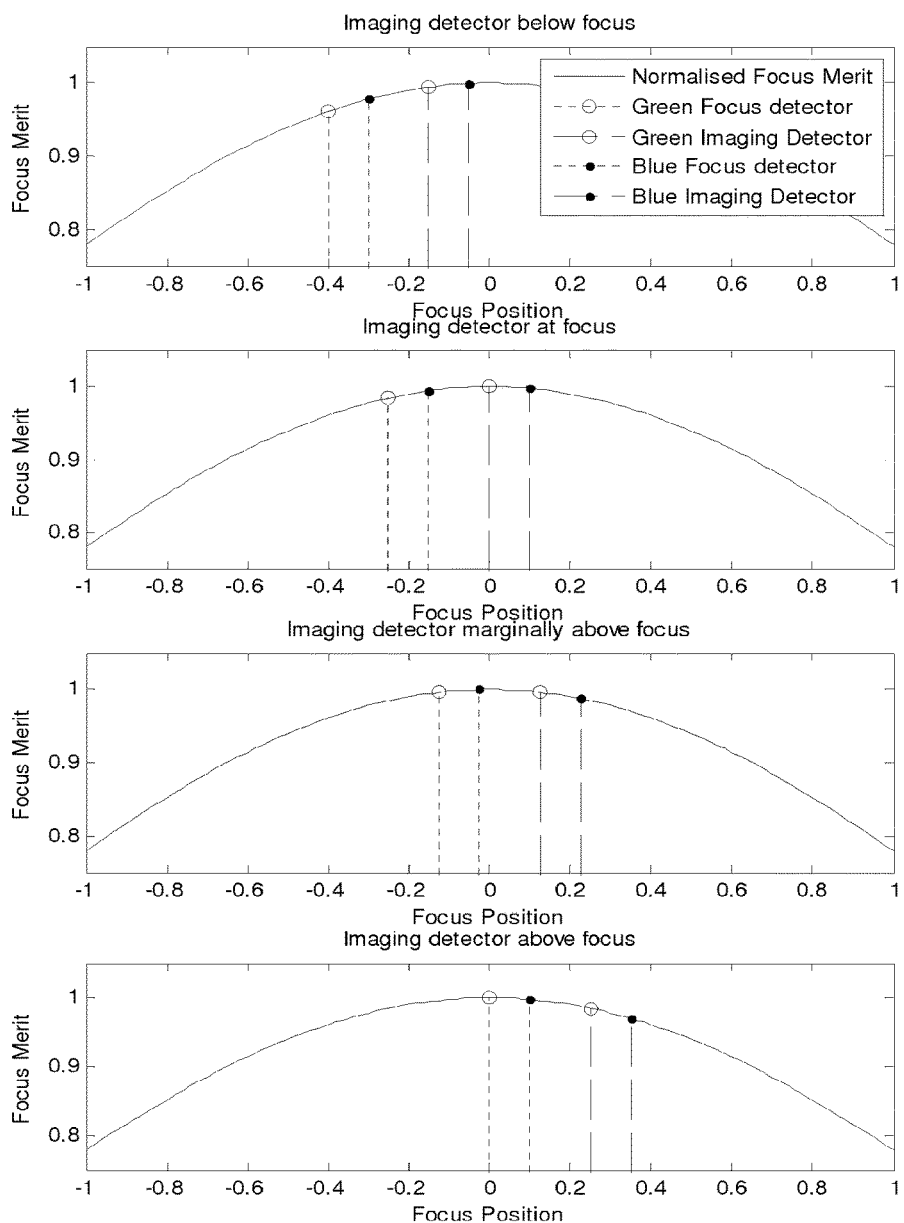
FIGS. 4A to 4D show focus merit curves according to a second embodiment of the invention.

The focus merit values obtained from the different channels can simply be compared (without plotting a focus merit curve) in order to estimate the in-focus level. For example, FIG. 4B shows the imaging line scan detector at the in-focus level for the green channel. This can be distinguished from the imaging line scan detector being below the in-focus level (seen in FIG. 4A), because in FIG. 4B the merit values for the blue channel on both detectors are similar, whereas this is not the case in FIG. 4A. The protocol for comparing merit values for the RGB channels can be described as follows:

(i) Measure the focus merit value of each channel on both detectors.

(ii) Select the two largest imaging line scan detector focus merit channels.

(iii) Select the imaging line scan detector channel with the largest focus merit as the primary channel and the other channel as the secondary channel.

(iv) Normalise the focus merit of each channel to the primary imaging line scan detector channel focus merit value.

(v) If the primary focus merit of the imaging line scan detector is greater than the primary focus merit of the focussing line scan detector by a first predetermined amount (for example 5%), move the focus level of the imaging line scan detector away from that of the focussing line scan detector.

(vi) If the primary focus merit of the imaging line scan detector is smaller than the primary focus merit of the focussing line scan detector by the first predetermined amount, move the focus level of the imaging line scan detector towards that of the focussing line scan detector.

(v) If the primary focus merit of the imaging line scan detector is greater than the primary focus merit of the focussing line scan detector but the difference is smaller than the first predetermined amount, and the secondary focus level of the focussing line scan detector is between the focus levels of the two detectors and the secondary focus merit of the imaging line scan detector is less than the secondary focus merit of the focussing line scan detector, then move the focus level of the imaging line scan detector towards that of the focussing line scan detector.

(vi) If the primary focus merit of the imaging line scan detector is greater than the primary focus merit of the focussing line scan detector but the difference is smaller than the first predetermined amount and the secondary focus level of the imaging line scan detector is between the focus levels of the two detectors and the secondary focus merit of the imaging line scan detector is greater than the secondary focus merit of the focussing line scan detector, then move the focus level of the imaging line scan detector towards that of the focussing line scan detector.

Figure 5:
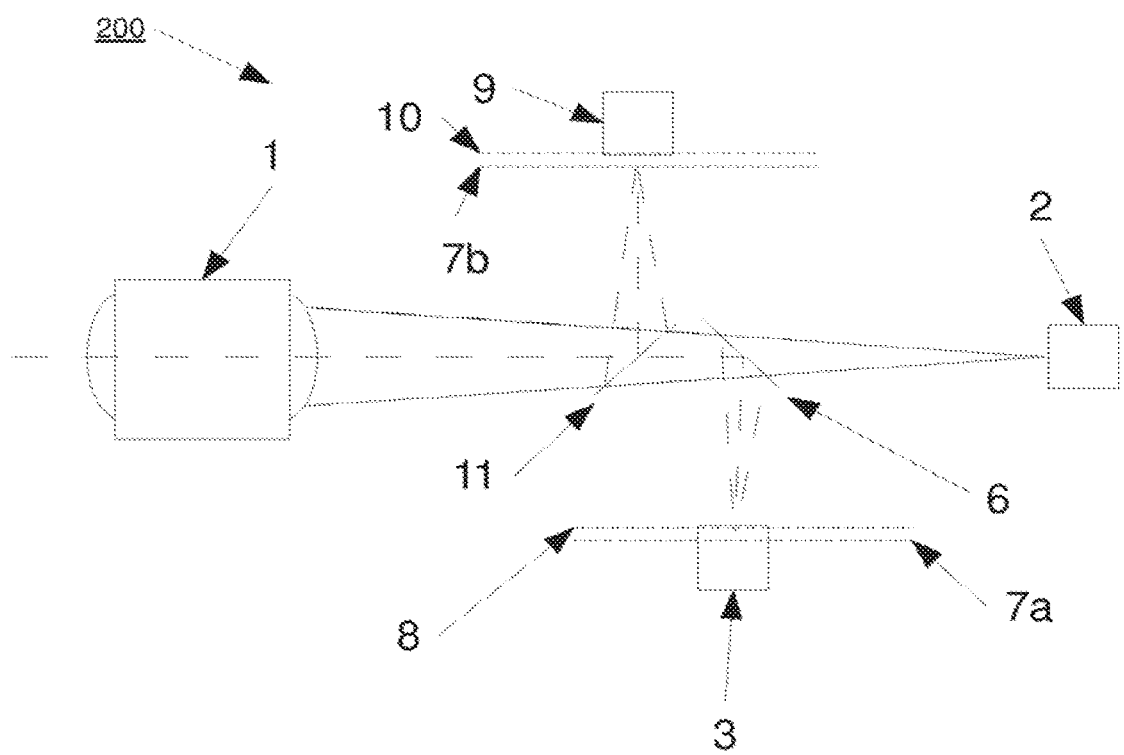
FIG. 5 illustrates an image scanning apparatus according a third embodiment of the invention.

FIG. 5 illustrates a schematic diagram of an apparatus 200 according to a third embodiment of the present invention. Similarly to the first embodiment, an imaging line scan detector 2 is used to image light originating from a sample (not shown) though lens 1. Typically the sample is moved relative to the system 200 in a plane perpendicular to the optic axis of the imaging line scan detector 2 such that the sample is imaged as a series of line scans. A first beam splitter 6 is used to direct light onto a first focussing line scan detector 3 as in the first embodiment. However, the presently described third embodiment further includes a second focussing line scan detector 9 which receives light from a second beam splitter 11.

Beam splitter 6 produces a co-conjugate plane 7a and beam splitter 11 produces a co-conjugate plane 7b. As in the first embodiment, the first focussing line scan detector is positioned below the co-conjugate plane 7a. The second focussing line scan detector 9 is positioned above the co-conjugate plane 7b, as seen in FIG. 5 (i.e. the co-conjugate plane 7b is positioned between the second focussing line scan detector and the sample).

Figures 6A, 6B, 6C:
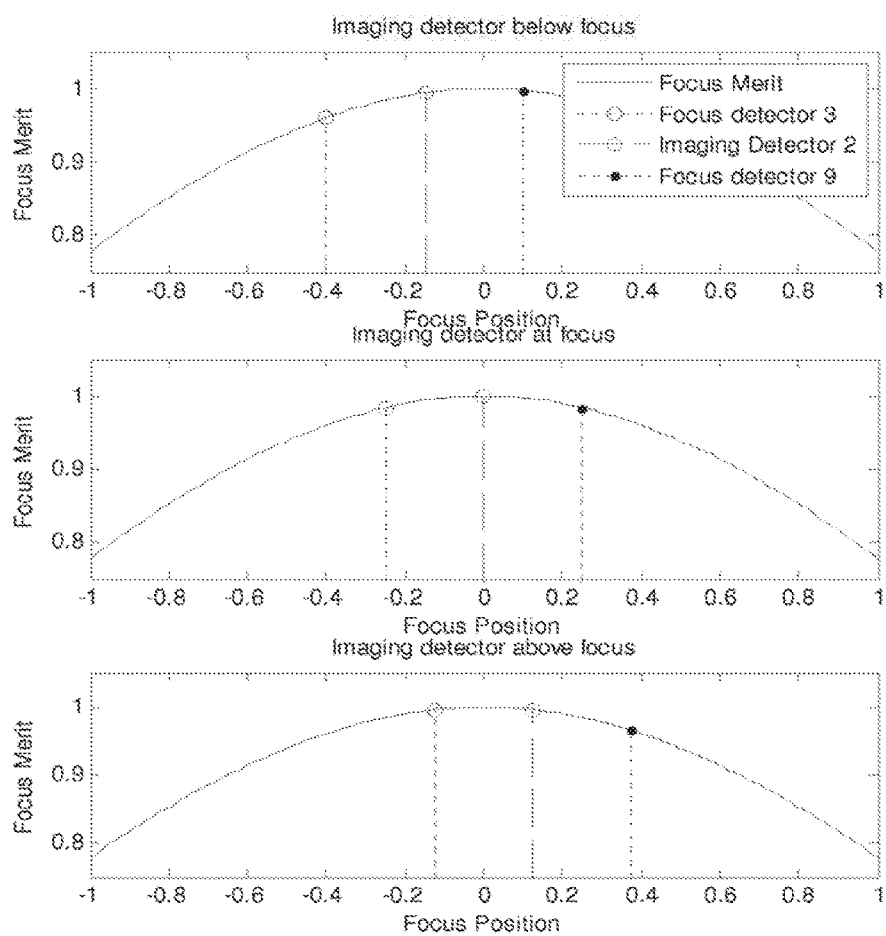
FIGS. 6A to 6C show focus merit curves according to the third embodiment of the invention.

Due to the beam splitters, each imaging detector 2, 3, 9 simultaneously images the same spatial location of the sample. Due to the presence of the second focussing line scan detector 9, three focus merit values can be simultaneously calculated at three different focus levels—one for each detector. The focus merit values are normalised to the focus merit value of the imaging scan line detector 2 (for example by dividing each focus merit value by the focus merit value obtained from the imaging line scan detector 2), and the three measurement values are used to plot a graph of focus parameter (ordinate) in the form of normalised focus merit values against focus level (abscissa). Such a "focus merit curve" is illustrated in FIGS. 6A-6C. The maximum of the focus merit curve provides the in-focus level of the sample by intersection of the curve maximum with the abscissa, and the imaging line scan detector is moved towards that maximum.

In a fourth embodiment, as an alternative to providing first and second focussing line scan detectors, the apparatus 100 schematically illustrated in FIG. 2 may further comprise a detector drive (not shown) operable to move focussing detector 3 to and fro along its optic axis 3a. This allows a range of focus merit values to be obtained at different focus levels above and below the co-conjugate plane 7. The focus merit values can then be normalised to those of the imaging line scan detector, and a focus merit curve generated using the data from the focussing detector 3. The maximum of the focus merit curve indicates the in-focus level of the sample and the imaging line scan detector 2 is moved towards the in-focus level in the same way as described above.

Figure 7A:
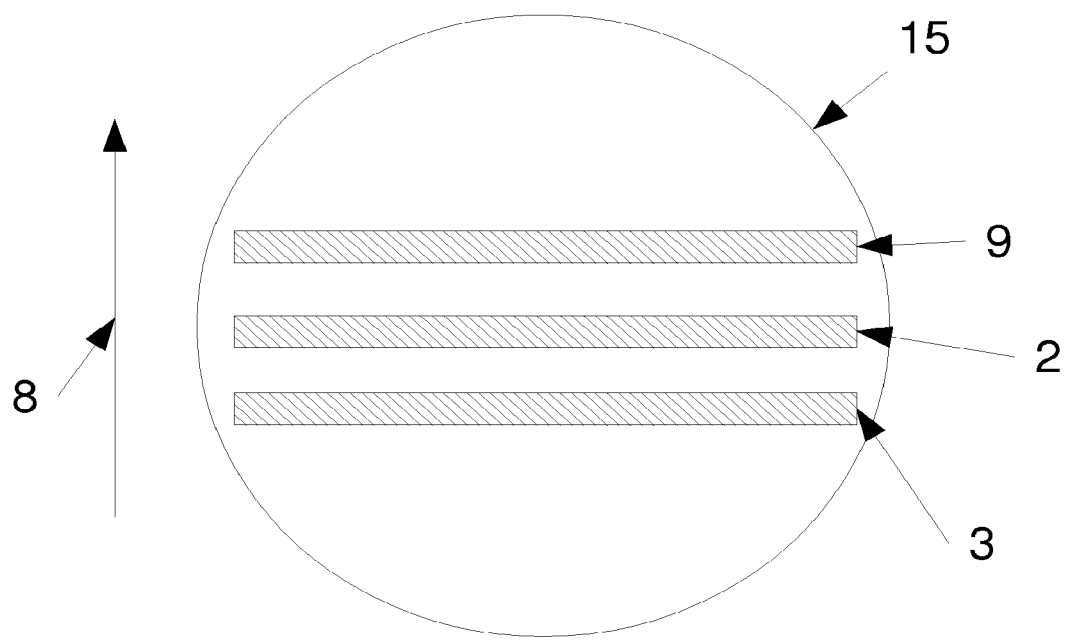
FIGS. 7A and 7B illustrate a detector layout according to a fifth embodiment of the invention.
Figure 7B:
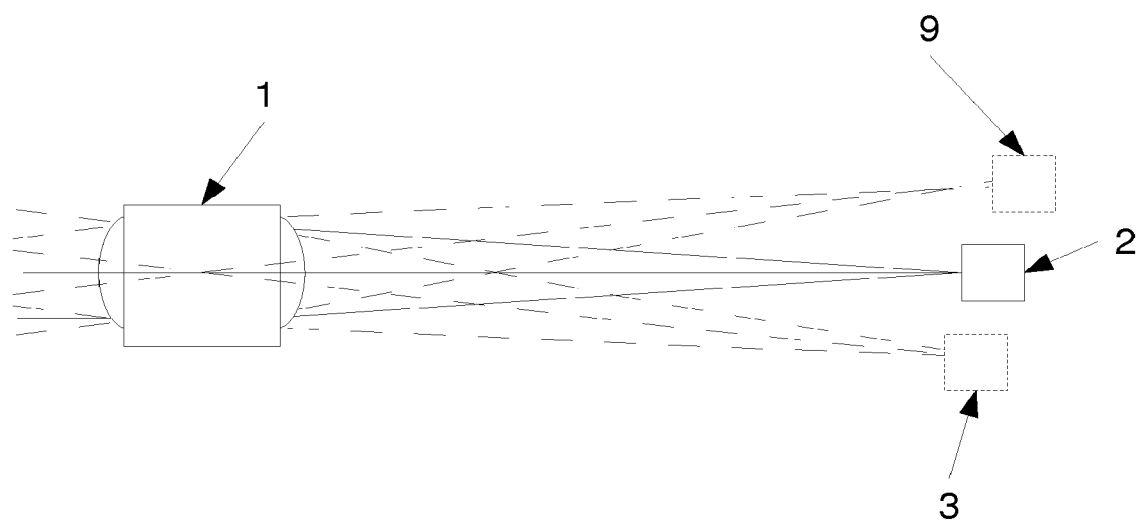

In a fifth embodiment of the present invention, first 3 and second 9 focussing line scan detectors are positioned adjacent the imaging line scan detector 2, as shown in FIGS. 7A and 7B. The focussing line scan detectors are typically located either side of the imaging line scan detector, although this is not essential. In the presently described fifth embodiment each of the line scan detectors is located within the image plane 15 as illustrated in FIG. 7A. The image lens 1 is typically rotationally symmetric, which produces the circular image plane 15. The two focussing line scan detectors are located at different focus levels to the imaging line scan detector, and at different focus levels to each other (clearly shown in FIG. 7B).

As the focussing line scan detectors 3, 9 receive image information along different optic axes than the imaging line scan detector 2, this advantageously means that each detector is fully illuminated. However, it also means that the spatial region of the sample imaged by detectors 2, 3, 9 is different. This means that focus merit values obtained simultaneously temporally will be affected not only by the focus and focus level, but also by the spatial content for each of the regions imaged. This can be overcome by temporally shifting image data collected from each of the detectors 2, 3, 9 such that image data from the same spatial region on the sample can be compared between the detectors 2, 3 and 9. As can be seen in FIG. 7A, as the target moves relative to the line scan detectors (shown by arrow 8), light will impinge first on detector 3, followed by detector 2 and lastly on detector 9. Using a time delaying process based on the scan speed, the same spatial region from the target can be compared at the different focus levels provided by detectors 2, 3 and 9.

Although FIGS. 7A and 7B show two focussing line scan detectors, the skilled person will appreciate that one, or three or more, focussing line scan detectors may be used.

Figure 8:
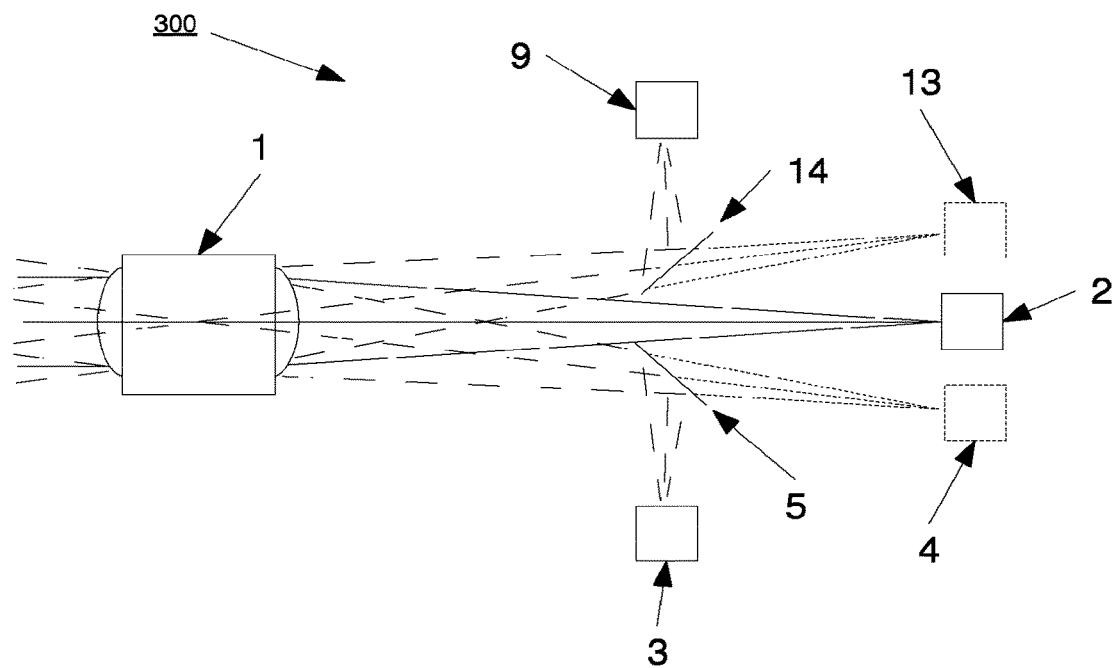
FIG. 8 illustrates an image scanning apparatus according to a sixth embodiment of the invention.

Often, due to the physical size of the line scan detectors and their packaging with respect to the image plane 15, it is not possible to locate the focussing line scan detectors adjacent the imaging line scan detector as seen in FIG. 7A. With high magnification imaging systems although the field numerical aperture may be high, the image numerical aperture is low and the conjugate length is long. This allows mirrors 5 and 14 to be positioned off-axis to reflect image information to focussing line scan detectors 3 and 9, as seen in FIG. 8 schematically illustrating apparatus 300 according to a sixth embodiment of the invention. Here, "off axis" means off axis from the optic axis 2a of the imaging line scan detector 2.

The mirrors 5 and 14 are preferably turning mirrors which are placed in the beam path and direct the beam to off-axis focussing line scan detectors 3 and 9 but advantageously permit all light to impinge on the imaging line scan detector 2. This set-up is equivalent to placing the focussing scan line detectors adjacent the imaging scan line detector, as illustrated by references 4 and 13 in FIG. 8, which show the virtual positions of detectors 3 and 9 respectively if no mirrors were present.

In a similar manner to third embodiment of the invention, the focussing line scan detectors 3, 9 are at different focus levels to that of the imaging line scan detector 2. Focus merit values normalised to those of the imaging line scan detector 2 can then be used to generate a focus merit curve to estimate the in-focus level as described above.

Figure 9:
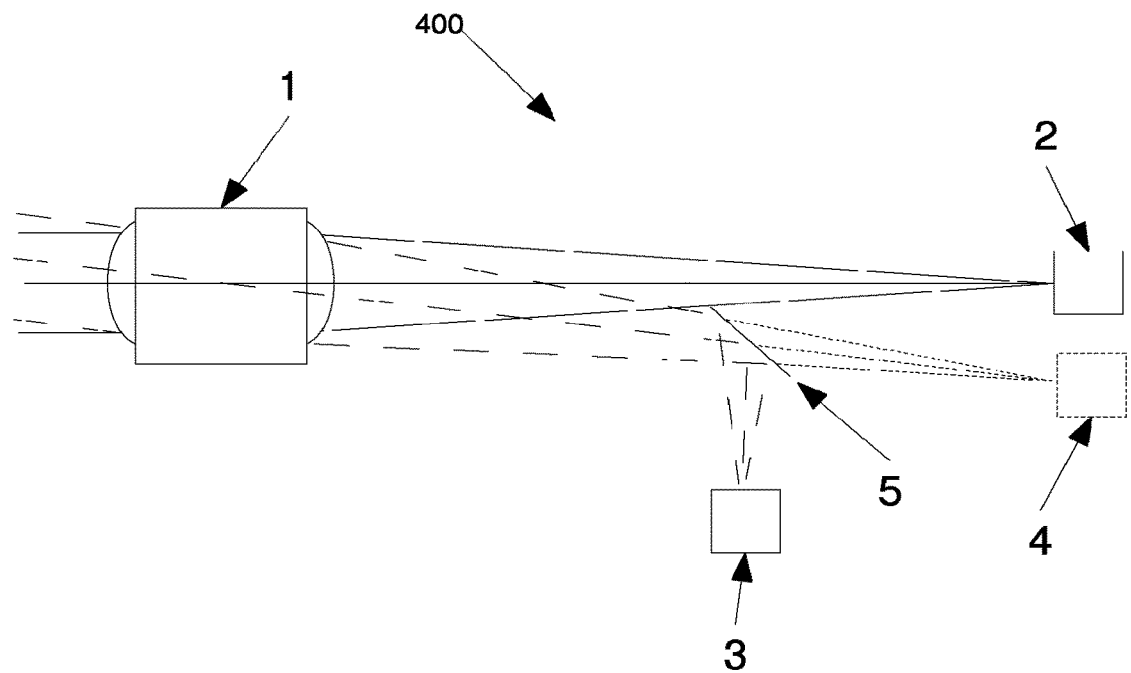
FIG. 9 illustrates an image scanning apparatus according to a seventh embodiment of the invention.

FIG. 9 illustrates apparatus 400 according to a seventh embodiment of the invention where only one focussing line scan detector 3 is used, where the focussing line scan detector 3 is at a different focus level to that of the imaging line scan detector 2. Here the in-focus level of the sample can be estimated by comparing normalised focus merit values of the imaging and focussing line scan detectors in the same manner as for the first embodiment of the invention.

Figure 10:
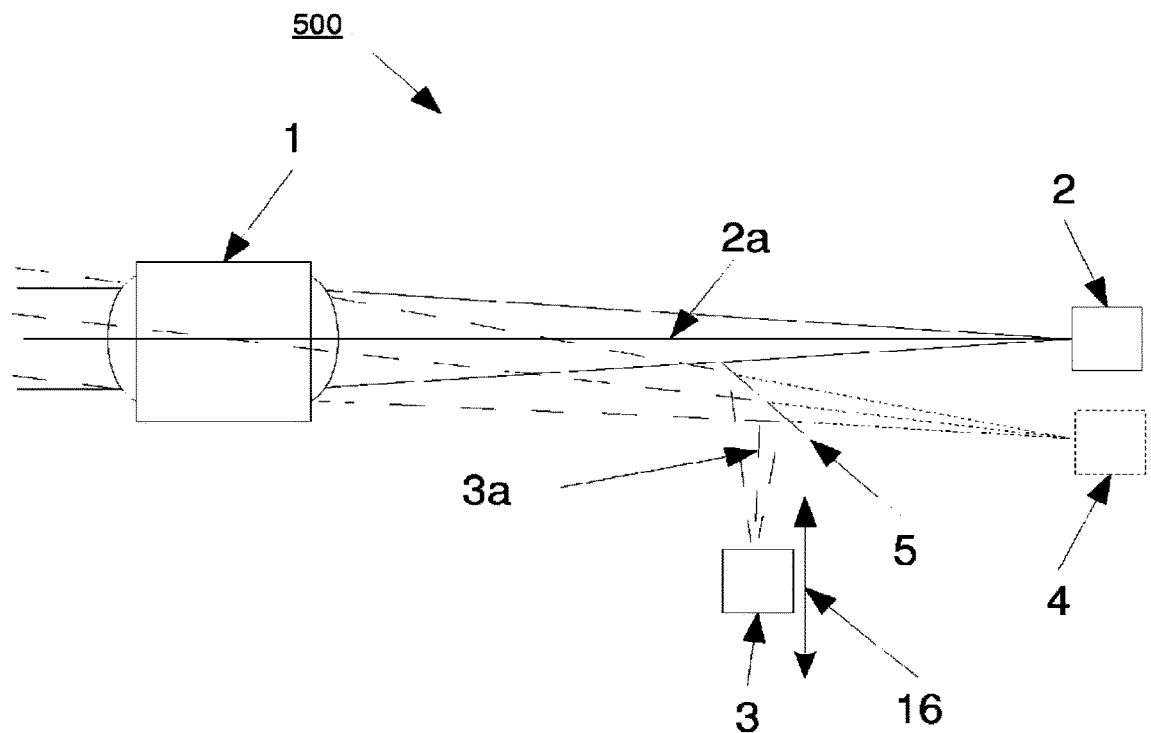
FIG. 10 illustrates an image scanning apparatus according to an eighth embodiment of the invention.
Figure 11:
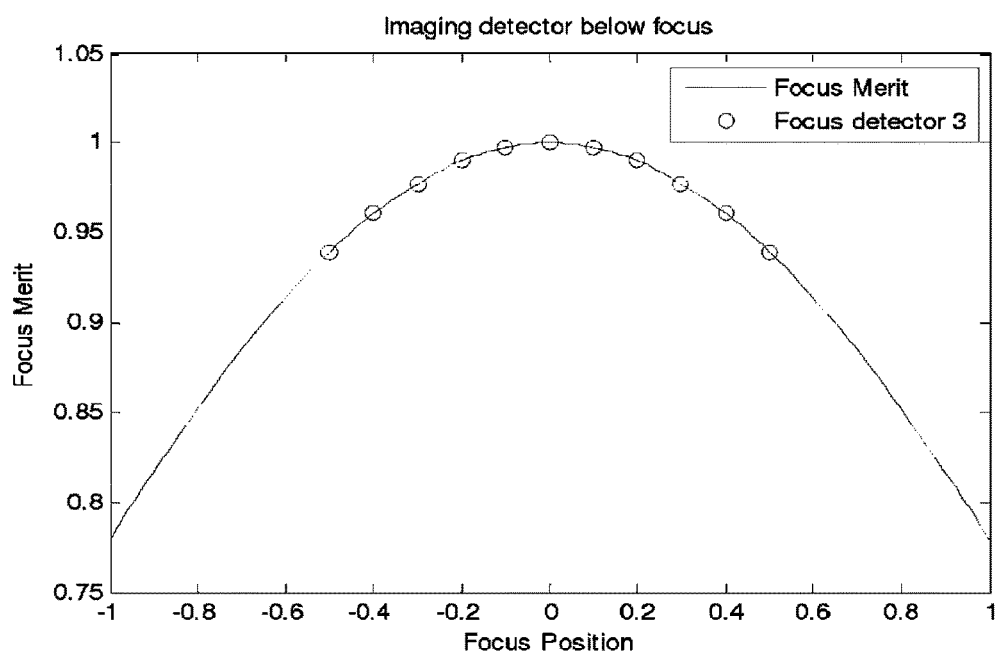
FIG. 11 shows a focus merit curve according to the eighth embodiment of the invention.

FIG. 10 schematically illustrates apparatus 500 according to an eighth embodiment of the present invention. In a similar manner to that described above, a turning mirror 5 is positioned off-axis from the optic axis 2$a$ of the imaging line scan detector 2 and reflects image information from the sample (not shown) to a focussing line scan detector 3. The apparatus further comprises a detector drive (not shown) operable to move the focussing line scan detector 3 to and fro along its optic axis 3$a$. This movement is illustrated by the double headed arrow 16. By moving the focussing line scan detector 3 along its optic axis 3$a$ in this manner, a plurality of focus merit values can be obtained at different focus levels. As explained above, these focus merit values are temporally shifted such that focus merit values from the focussing line scan detector 3 can be compared with the focus merit value from the imaging line scan detector 2 with respect to the same spatial region on the sample. The focus merit values from the focussing line scan detector 3 are then normalised to the focus merit value from the imaging line scan detector 2 and a merit focus curve is produced using these data, as seen in FIG. 11. The nominal in-focus level of the sample can be estimated from the focus merit curve by the intersection of the curve maximum with the abscissa, and the imaging line scan detector moved towards that focus level. Typically at least three data points are desirable to generate an acceptably accurate focus merit curve. The normalisation of the focus merit values from the focussing line scan detector 3 to that of the imaging line scan detector 2 is optional, and may not be required if the sample is substantially homogenous.

Figure 12:
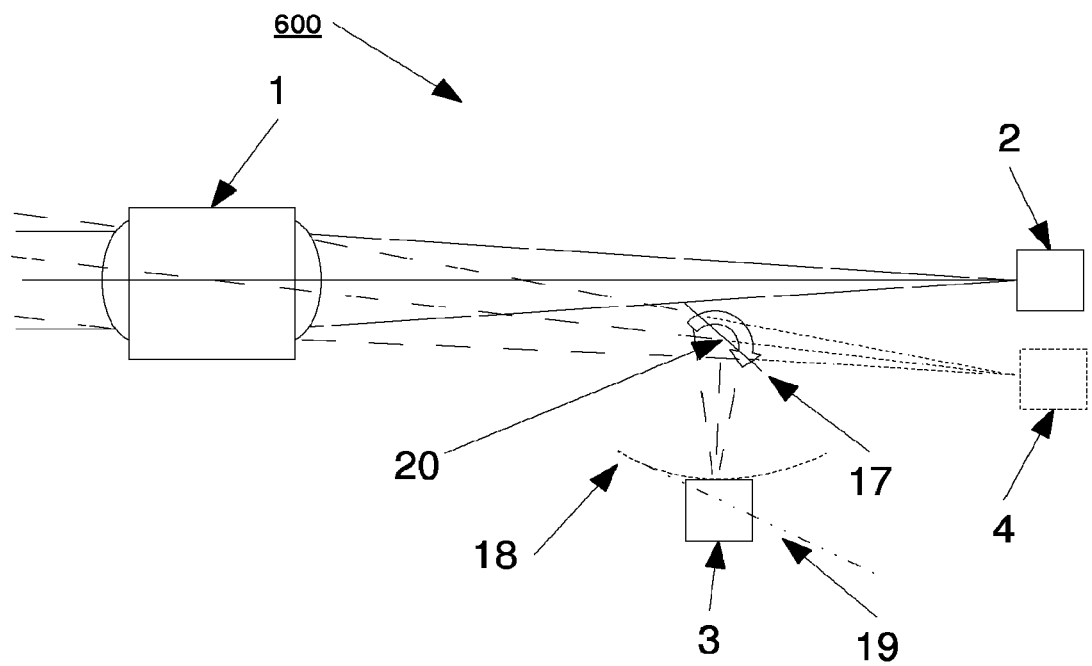
FIG. 12 illustrates an image scanning apparatus according to a ninth embodiment of the invention.

One problem with the apparatus 500 of the eighth embodiment of the present invention is that the distance that the focussing line scan detector 3 has to move in order to alter the focus is scaled to the depth of field by the square of the optical magnification. As an example, in a system with an optical magnification of 40×, a 1 µm change in the field focus produces a 1.6 mm change in the focus position of the focussing line scan detector 3. In a ninth embodiment 600 of the present invention, the turning mirror is replaced with a rotating turning mirror 17 which rotates about turning point 20 where the principle ray of the focussing line scan detector 3 intersects with the turning mirror 5. This apparatus 600 is schematically shown in FIG. 12.

The rotation of the turning mirror 17 causes the image to scribe an arc 18 centred on the point 20. The focussing detector 3 remains stationary. This means that the focussing line scan detector has a different part (spatial location) of the sample imaged onto it as a result to this rotation of the turning mirror 17, but because the image plane 19 remains tangential to the scribed arc 18, the focus level of the sample being imaged by the focussing line scan detector 3 is altered. If the rotation of the turning mirror 17 is synchronised with the motion of the sample 8 then the sample spatial location can be maintained on the focus detector whilst the focus is altered during the turning process. This will then enable a focus merit curve to be generated from the same spatial location, which advantageously removes sample effects from the focus merit values. Once the curve has been generated the turning mirror 17 can be set back to the original angle and the process repeated for a new measurement. As described above the focus merit curve can be used to determine the in-focus level of the sample.

Figure 13:
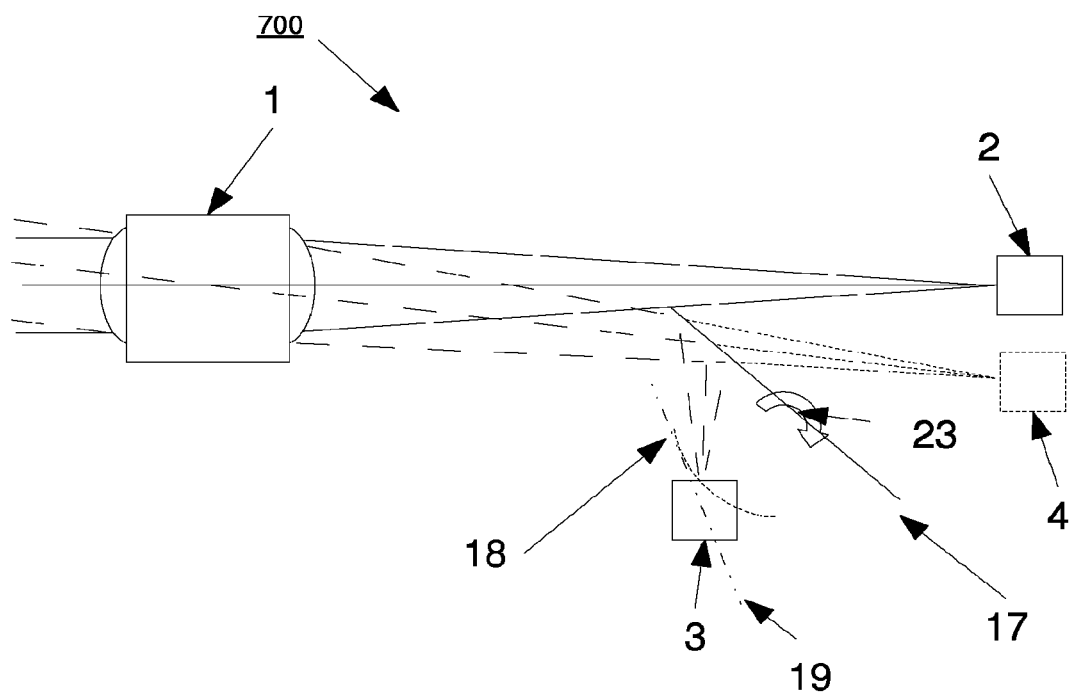
FIG. 13 illustrates an image scanning apparatus according to a tenth embodiment of the invention.

In a tenth embodiment 700 of the present invention (shown schematically in FIG. 13), the turning mirror 17 is rotated about a point 23 displaced from the intersection of the principle ray with the turning mirror 20. This means that a greater change in focus level of the image at the focussing line scan detector 3 is produced for the same turning angle of the mirror, as seen in FIG. 13. This is because the rotation produces a focus change not only with the tangent 19 on the inscribed arc 18 centred on the rotation point 23 but also with the displacement along the arc 18.

Figure 14:
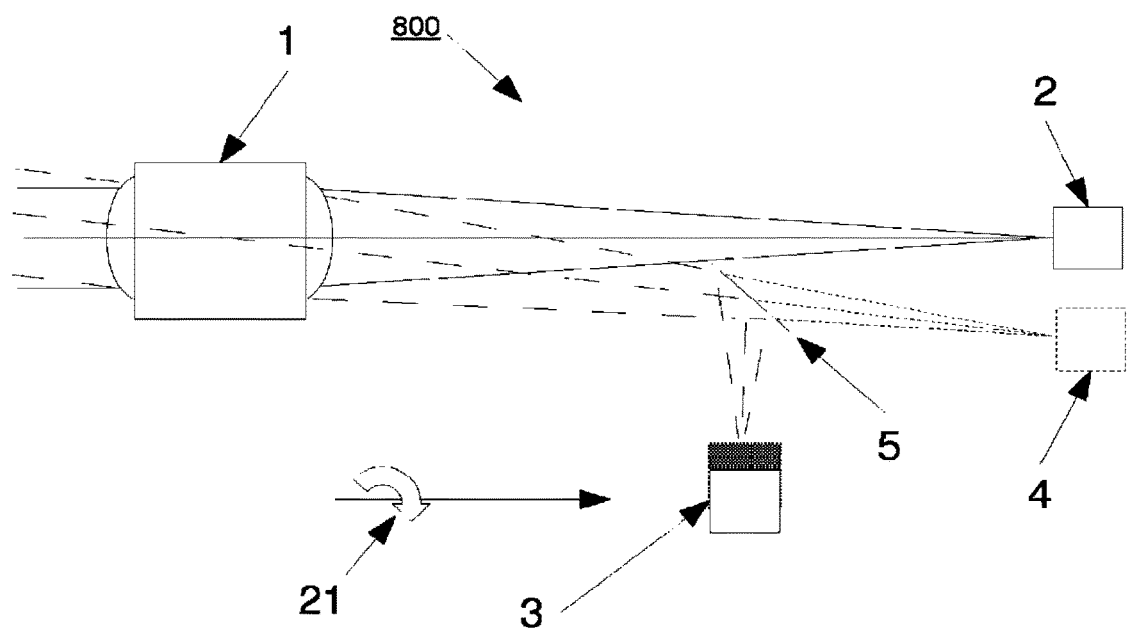
FIG. 14 illustrates an image scanning apparatus according to an eleventh embodiment of the invention.
Figure 15:
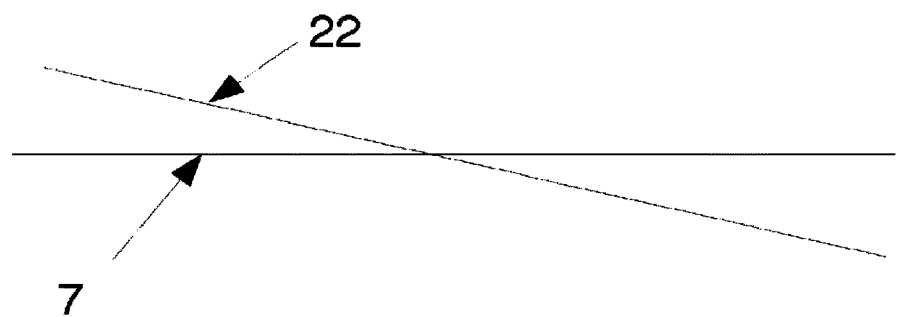
FIG. 15 illustrates a scan line according to the eleventh embodiment of the invention.

FIG. 14 shows an apparatus 800 according to an eleventh embodiment of the present invention. The arrangement is similar to that seen in FIG. 10; however the focussing line scan detector is rotated about an axis 21 perpendicular to the line (optic axis) of the focussing line scan detector 3. The focussing line scan detector 3 therefore produces a differential focus 22 along the line of the detector 7 as schematically shown in FIG. 15. In an alternative embodiment, the focussing line scan detector is tilted with respect to its optic axis to effect the differential focus along the line of the detector. If the sample is homogeneous in spatial frequency (detail) along the line of the focussing line scan detector 3, then the focus merit function of the focussing line scan detector 3 will peak along the length of the focussing line scan detector where the in-focus plane intersects the focussing line scan detector 3.

Figure 16A:
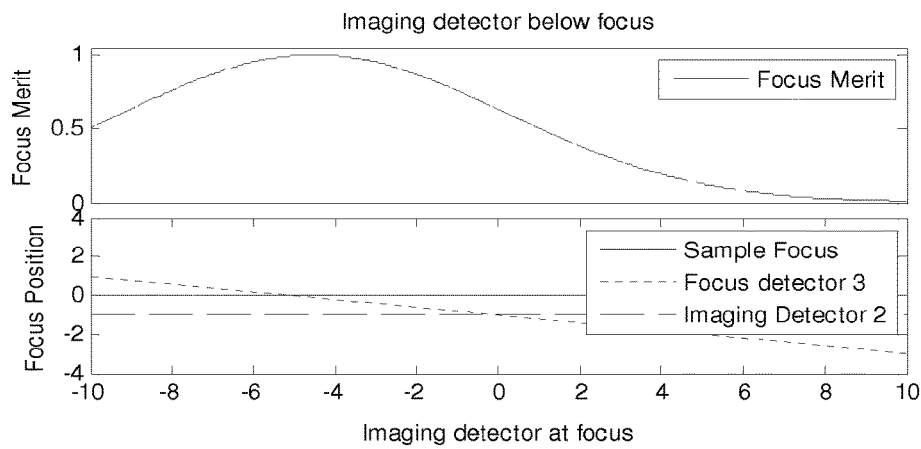
FIGS. 16A to 16C show focus merit and focus position curves according to the eleventh embodiment of the invention.
Figure 16B:
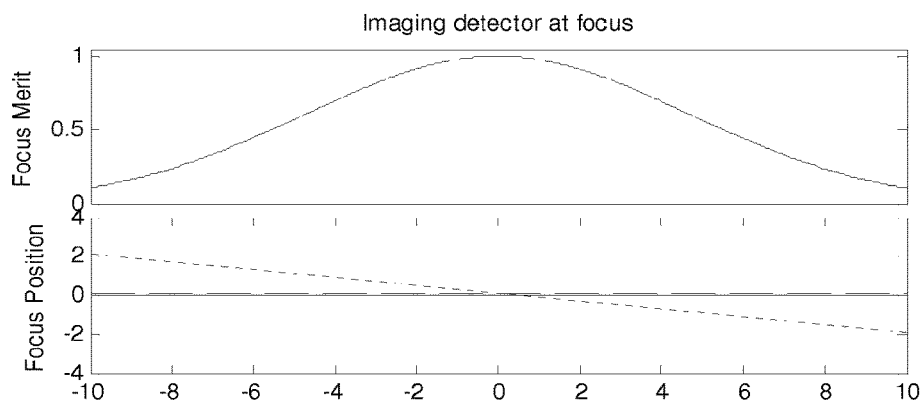
Figure 16C:
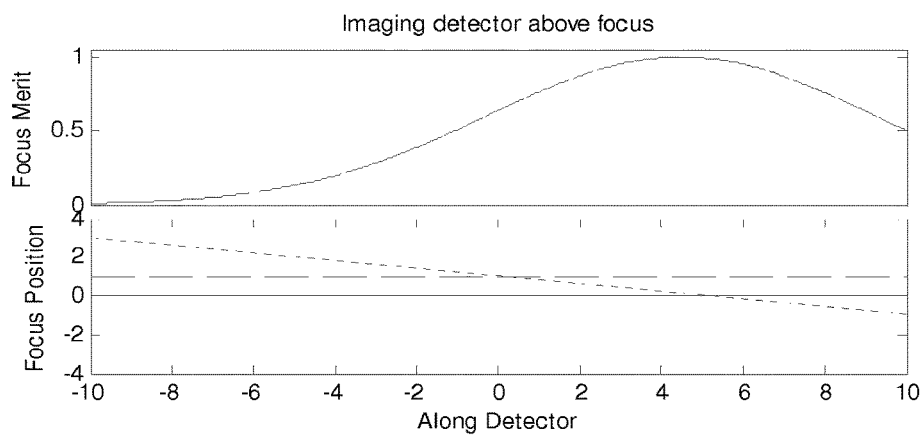

An example of this is in FIGS. 16A to 16C. In FIG. 16A the focussing line scan detector intersects the sample in-focus plane at approximately −5 on the scale along the focussing line scan detector 3. This is where the focus merit curve peaks, indicating that the imaging line scan detector 2 is below the in-focus plane (i.e. between the sample and the in-focus plane). FIG. 16C illustrates the case where the imaging line scan detector is above the in-focus plane (i.e. the in-focus plane is between the sample and the detector 2), and the focus merit curve peaks at approximately +5 on the scale along the detector 3. FIG. 16B illustrates the case where the imaging line scan detector is positioned at the in-focus plane.

If the sample is not spatially uniform, then this process (producing a differential focus along the line of the focussing line scan detector 3) may give a misleading result. For example, if there is only detail on one side of the detectors 2 and 3 then even though the imaging detector 2 may be at the correct focus level, the peak of the focussing line scan detector merit curve will be displaced from the centre of the focussing line scan detector 3 and biased towards the position of the detail. However, this situation can be rectified by using the image data collected at the imaging line scan detector 2. In a twelfth embodiment, this image data can be used to calculate "detail merit" values in a similar manner to the focus merit values obtained from the focussing line scan detector image data. The "detail merit" is the same focus parameter as the focus merit obtained from the focussing line scan detector. Therefore the detail merit values can be seen to be a numerical value dependent on the amount of fine detail in the image information in the same way as the focus merit values. In alternative embodiments the detail merit is a different focus parameter to the focus merit and is normalised to the focus merit values obtained by the focussing line scan detector.

These detail merit values can be weighted with the focus merit values which will provide a corrected merit function giving the correct focus reading and preventing incorrect focus measurements.

Figures 17A, 17B, 17C:
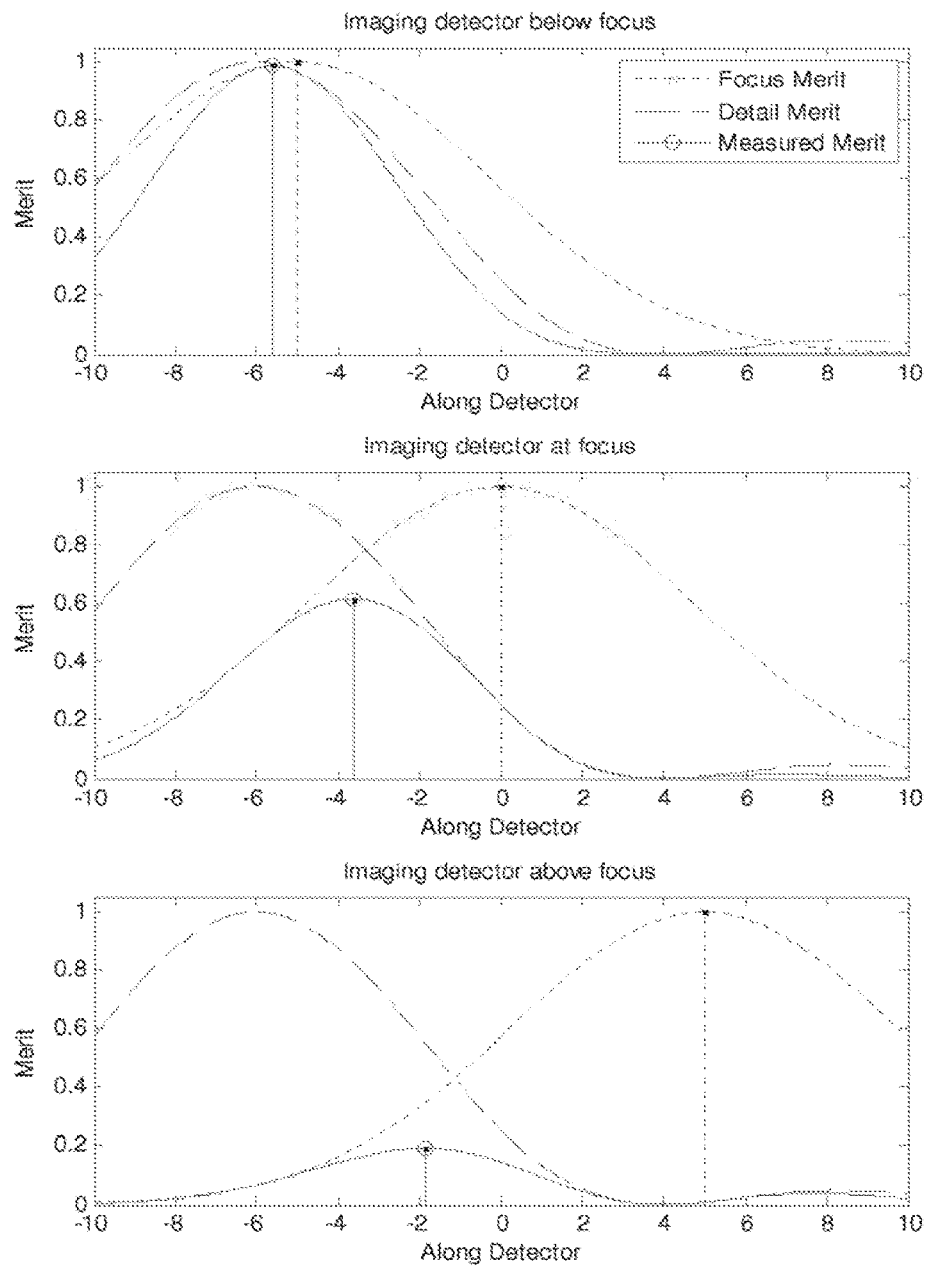
FIGS. 17A to 17C show focus merit and detail merit curves according to a twelfth embodiment of the invention.

FIGS. 17A to 17C show an example of the use of the detail merit values. Here, there is much more detail in the left hand side of the image, and the detail merit curve therefore peaks on the left hand side of the detector. The focus merit curves correspond to the focus merit curves seen in FIGS. 16A to 16C, and relate to whether the imaging line scan detector is at, above or below the in-focus plane. However, due to the detail being in the left side of the image, the measured focus merit peak (generated using focus merit values from the focussing line scan detector 3) peaks on the left side of the focussing line scan detector 3 even when the real focus peak is on the right side of the focussing line scan detector (see FIG. 17C). This means that if the measured focus merit values were to be used directly, the system could even measure the wrong direction for optimum focus of the imaging line scan detector 2.

If the detail merit values are used—for example division of the measured merit by the detail merit—it is possible to recover the focus merit that will give the correct focus position. For example, as can be seen in FIG. 17B, the measured merit and the detail merit curves coincide at 0 on the abscissa, which would give the correct focus position for the imaging line scan detector being in focus.

Features seen in any one of the above embodiments are not limited to that single embodiment and may be used in any other embodiment.

The invention claimed is:

1. A method of estimating an in-focus level of a target in an image scanning apparatus, wherein the image scanning apparatus comprises a first line scan detector configured to obtain one or more image scan lines of the target and a second line scan detector configured to obtain one or more focus scan lines of the target, the method comprising:
    obtaining at least one image scan line of the target using the first line scan detector, each at least one image scan line being obtained at a respective focus level;
    obtaining at least one focus scan line of the target using the second line scan detector, each at least one focus scan line being obtained at a respective focus level and wherein the focus level of the at least one image scan line is different from the focus level of the at least one focus scan line;
    calculating at least one focus parameter using at least the at least one focus scan line; and
    estimating a nominal in-focus level of the target using the calculated focus parameter(s);
    wherein the image and focus scan lines are obtained from different positions in the target and wherein image information is obtained by the said first and second line scan detectors along different optic axes from the target so as to produce the said respective image and focus scan lines;
    wherein the image information is reflected to the second line scan detector using a mirror; and
    wherein the mirror is rotated so as to provide focus scan lines of the target at different focus levels.

2. A method according to claim 1, further comprising the step of calculating at least one further focus parameter using either said at least one image scan line or a further said focus scan line.

3. A method according to claim 1, wherein the calculating step comprises calculating at least one focus parameter for each of the first line scan detector and second line scan detector using the respective at least one image scan line and at least one focus scan line.

4. A method according to claim 3, wherein the at least one focus parameter is a focus merit value having a maximum value representing an in-focus level, wherein the focus level of the first line scan detector is modified by an amount and in a direction according the magnitude and sign of the difference between the focus merit value of the first and second line scan detectors.

5. A method according to claim 1, wherein the step of obtaining at least one focus scan line comprises modulating a focus level of the second line scan detector such that a plurality of focus scan lines are obtained at different focus levels.

6. A method according to claim 1, wherein the image and focus scan lines are obtained from a common position within a plane passing through the target and having a plane normal defining an optic axis along which each of the first and second line scan detectors receive the image information so as to produce the said respective image and focus scan lines.

7. A method according to claim 1, wherein the mirror is rotated about a point centred upon the optic axis of the second line scan detector.

8. A method according to claim 1, wherein the mirror is rotated about a point displaced from the optic axis of the second line scan detector.

9. A method according to claim 1, further comprising moving the target in accordance with the rotation of the mirror such that the focus scan lines are obtained from a common location upon the target.

10. A method according to claim 1, further comprising moving the second line scan detector with respect to the target so as to obtain a plurality of focus scan lines at different focus levels.

11. A method according to claim 1, further comprising rotating the second line scan detector so as to modulate the focus level as a function of position across the scan line of the second line scan detector.

12. A method according to claim 1, further comprising using image data from one or each of the at least one focus or image scan lines to generate a detail parameter; and using the detail parameter in calculating the focus parameter(s).

13. A method according to claim 1, wherein when the said line scan detectors are multi-channel detectors, the method comprises calculating an in-focus level for different channels of the detector, evaluating a focus parameter for each channel and using one or more of the focus parameters for the channels in the estimating step.

14. A method according to claim 1, further comprising adjusting the focus level of the second detector relative to the focus level of the first detector.

15. A method according to claim 1, wherein the at least one focus parameter is a focus merit value having a maximum value representing an in-focus level.

16. A method according to claim 15, wherein the focus merit value is a normalised value.

17. A method according to claim 1, wherein the method further comprises adjusting the focus level of the first line scan detector by moving the first line scan detector to the nominal in-focus level.

18. A method according to claim 1, wherein a temporal shift is applied between data from the scan lines of the first and second line scan detectors and wherein the temporal shift is a function of relative movement between the target and the image scanning apparatus.

19. A method according to claim 1, wherein image scan lines are obtained from a number of locations upon the target so as to form a swathe.

20. A method according to claim 19, wherein the focus level of the first line scan detector is adjusted to the nominal in-focus level in real time during formation of a swathe such that the image scan lines within the swathe are obtained at different focus levels.

21. A computer program product comprising program code means adapted in use to perform the method according to claim 1.

22. Image scanning apparatus comprising:
a first line scan detector configured to obtain one or more image scan lines of a target;
a second line scan detector configured to obtain one or more focus scan lines of the target;
imaging optics for causing an image of the target to be provided to the first and second line scan detectors, wherein the first and second line scan detectors lie upon different respective optic axes of the imaging optics and wherein the imaging optics includes a mirror arranged to direct a first part of image information from the target to the second line scan detector;
a mirror drive adapted to rotate the mirror so as to direct a second part of the image information to the second line scan detector;
a drive system for causing the first line scan detector to obtain the first part and the second part of the image information, said the first part and the second part of the image information corresponding to different locations on the target, wherein the mirror drive is operated in accordance with the drive system such that the focus scan lines are obtained from a common location upon the target;
and a processor configured to:
obtain at least one image scan line of the target at a respective focus level using the first line scan detector;
obtain at least one focus scan line of the target at a respective focus level using the second line scan detector and wherein the focus level of the at least one image scan line is different from the focus level of the at least one focus scan line;
calculate at least one focus parameter using at least the at least one focus scan line; and
estimate a nominal in-focus level of the target using the calculated focus parameter(s).

23. Image scanning apparatus according to claim 22, further comprising a first focussing device configured to modify the focus level between the target and the first line scan detector, and wherein the processor is further configured to:
operate the first focussing device to move the focus level of the first line scan detector to the estimated nominal in-focus level.

24. Image scanning apparatus according to claim 22, wherein the image scanning apparatus further comprises a target stage for retaining the target, wherein the drive system is configured to move the target stage in accordance with the rotation of the mirror such that the focus scan lines are obtained from a common location upon the target.

25. Image scanning apparatus according to claim 22, further comprising a detector drive adapted to move the second line scan detector along its respective optic axis.

26. Image scanning apparatus according to claim 22, further comprising a detector drive adapted to rotate the second line scan detector so as to modulate the focus level as a function of position across the scan line of the second line scan detector.

27. Image scanning apparatus according to claim 22, wherein the mirror drive is adapted to rotate about a point displaced from the optic axis of the second line scan detector.

28. Image scanning apparatus according to claim 22, wherein the focus levels of the first and second line scan detectors are independently controllable relative to each other.

* * * * *